United States Patent [19]
Mori

[11] 3,708,782
[45] Jan. 2, 1973

[54] ABRUPT BRAKE APPLICATION INDICATOR FOR A MOTOR VEHICLE

[75] Inventor: Takakazu Mori, Toyota, Japan

[73] Assignee: Toyota Jidosha Kogyo Kabushiki Kaisha, Toyota, Japan

[22] Filed: June 3, 1970

[21] Appl. No.: 43,112

[30] Foreign Application Priority Data

June 5, 1969 Japan ....................................44/44138

[52] U.S. Cl. ....................................340/66, 340/71
[51] Int. Cl. ....................................B60q 1/44
[58] Field of Search ....................................340/71, 69, 66, 72

[56] References Cited

UNITED STATES PATENTS

| | | | |
|---|---|---|---|
| 1,676,412 | 7/1928 | Pervier | 340/71 |
| 2,156,751 | 5/1939 | Collins | 340/71 UX |
| 2,946,042 | 7/1960 | Beasley | 340/69 |
| 3,019,415 | 1/1962 | Marion | 340/82 |
| 3,492,638 | 1/1970 | Lane | 340/66 |
| 3,500,315 | 3/1970 | Shimada | 340/82 |
| 3,541,550 | 11/1970 | Hamre | 340/52 F X |
| 3,548,372 | 12/1970 | Yonezu | 340/82 |

*Primary Examiner*—Kenneth N. Leimer
*Attorney*—McGlew and Toren

[57] ABSTRACT

A first switch, mounted in a brake pedal pad, turns on in response to slight pressure and remains on during continuance of the pressure. A second switch turns on when the brake pedal is moved or when the brake hydraulic pressure reaches a predetermined level. Closing of the first switch starts charging of a capacitor through a resistor. Closing of the second switch completes a circuit that turns on a brake lamp. The second switch also energizes a relay coil in the emitter-collector path of a transistor. If the decaying charging current through the resistor is still sufficiently high by the time the second switch is closed, the before-mentioned resistor biases on the transistor and operates the relay. The latter brightens the illumination of the lamp or flashes the lamp on and off. If, by the time the second switch is closed, the capacitor is already charged, no further charging current flows through the resistor. The transistor remains non-conductive and there is no change in the brake lamp. Thus, abrupt application of the brakes produces bright illumination or flashing illumination of the brake lamp. Normal slower application of the brake pedal produces a normal illumination of the lamp.

12 Claims, 3 Drawing Figures

INVENTOR

TAKAKAZU MORI

BY McGlew & Toren

ATTORNEY

ABRUPT BRAKE APPLICATION INDICATOR FOR A MOTOR VEHICLE

This invention relates to an abrupt brake application indicator for a motor vehicle. More particularly, the invention is concerned with a device for indicating the application of the brake to bring a motor vehicle to a halt in case of emergency by rapidly depressing the brake pedal with a violent force so as to warn the driver of a following motor vehicle of the danger which might lie ahead if he does not take appropriate steps immediately.

Nowadays, the traffic on the roads is so heavy that it is difficult for drivers to drive their automobiles according to the provisions of the law that require them to maintain their cars spaced apart from the preceding car a prescribed distance, except on some roads where traffic is not heavy. On roads of heavy traffic, a driver must always pay attention to the brake lamp of a preceding car while driving his car. If the preceding car applies the brake in case of emergency by depressing the brake pedal with a violent force, the driver of the following car will depress the brake pedal of his car as soon as he finds that the brake lamp of the preceding car is turned on. In such a case, it is difficult to determine whether the lighting of the brake lamp of the preceding car indicates that the preceding car is going to slow down or going to bring the car to a halt so as to cope with an emergency. This inevitably causes a traffic accident, resulting in the development of traffic jam and casualties to the drivers and passengers of the cars involved in the accident. Therefore, the drivers must be on the alert at all times and this places unacceptable burden on them, so that driving has become a nerve-racking operation.

This invention has as its object the provision of an abrupt brake applicator for a motor vehicle having a brake system which obviates the aforementioned disadvantages of the conventional indication device. According to the present invention, there is provided an abrupt brake applicator indicator for a motor vehicle which is operative to actuate warning means, for example, to turn on a warning lamp with increased brightness, for informing the driver of a following vehicle of the application of the brake to cope with emergency, when the speed at which the brake pedal is depressed in the initial stages of application of the brake is higher than a predetermined level or when the time elapsing after the foot is placed on the brake pedal or the brake pedal is slightly depressed after the foot is placed on it till the hydraulic pressure of the hydraulic system for the brake reaches a predetermined value is shorter than a predetermined time interval. The device of the present invention is characterized in that the warning given to the driver of a following car in case the brake is applied to the preceding car to cope with emergency stimulates the driver and attracts his attention to such a degree that he never fails to recognize the warning, thereby permitting him to apply the brake at once to prevent an accident that might otherwise be occurred.

The other objects as well as features and advantages of the invention will become apparent from consideration of the description set forth hereinafter when considered in conjunction with the accompanying drawing, in which.

Figure 1:
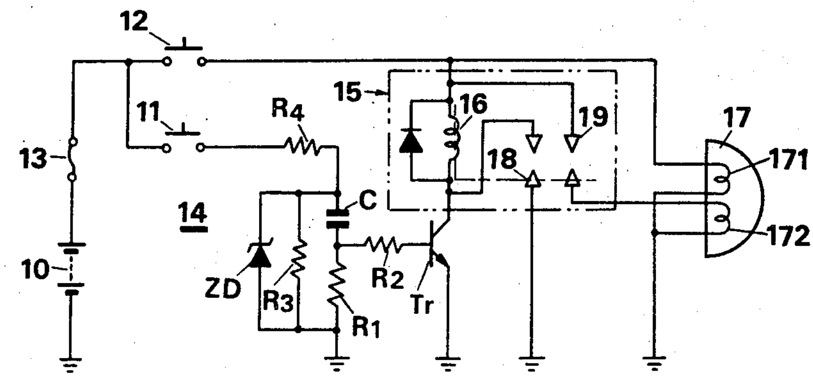
FIG. 1 is a circuit diagram of a first embodiment of this invention.

The invention will be described with reference to preferred embodiments shown in the drawing in which a brake lamp is used as warning means to inform the application of the brake to stop a car in case of emergency.

Means for detecting the speed at which the brake pedal is depressed at the initial stages of application of the brake consists, for example, of a first switch which is turned on as soon as the foot is placed on the brake pedal, and a second switch which is turned on after the stroke of the brake pedal has reached a predetermined level. The speed at which the brake pedal is depressed is judged by the time elapsing after the first switch is turned on till the second switch is turned on. A signal produced by the detection means is transmitted to a decision circuit which decides whether the speed of the brake pedal detected by the detecting means is higher or lower than a predetermined level. When the time elapsing after the first switch is turned on till the second switch is turned on is shorter than a predetermined time interval, the decision circuit decides that the brake has been applied to cope with emergency and produces a signal. The signal produced by the decision circuit is transmitted to indication means which indicates that the brake has been applied to cope with emergency, the indication means being maintained in operative state as long as the brake device continues in operation.

The aforementioned second switch may be operated by the rate of increase of the hydraulic pressure in the brake hydraulic system.

In FIG. 1, there is shown an embodiment of the invention which detects the speed at which the brake pedal is depressed and turns on a brake lamp 17 consisting of a brake filament and a warning filament.

As shown, a first switch 11 which is adapted to be turned on when the foot is placed on a brake pedal or the brake pedal is slightly depressed by the foot placed thereon is inserted between a power source 10 and a transistor $T_r$. A second switch 12 which is adapted to be turned on when the stroke of the brake pedal has reached a predetermined level is inserted between the power source 10 and the brake lamp 17. Preferably, the first switch 11 is a tape-shaped switch which is embedded in a pedal pad and adapted to be turned on when a slight pressure is applied thereto or the pedal is depressed in a very short stroke. The second switch 12 may be either a mechanical switch which is adapted to be turned on when the brake pedal is moved or a hydraulic switch which is adapted to be actuated when the hydraulic pressure reaches a predetermined level.

Besides a first filament 171 of ordinary brightness for brake, a second filament 172 for warning is provided in the brake lamp 17 to increase its brightness.

Inserted between the first switch 11 and second filament 172 are a time constant circuit 14 comprising a capacitor C, resistor $R_1$ and Zener diode ZD and a relay box 15 having a relay solenoid 16, self-hold contact 18 and contact 19. If the time elapsing after the first switch 11 is turned on till the second switch 12 is turned on is shorter than a value set for the time constant circuit 14 (that is, when the brake is applied to cope with emergency), the relay solenoid 16 will be energized as subsequently to be described so as to supply power to the second filament 172.

Normal Application of the Brake

In normal application of the brake, the second switch 12 will be turned on 1 to 2 seconds after the first switch 11 is turned on by stepping on the brake pedal of the motor vehicle. If the first switch 11 is turned on, a current will pass through a resistor $R_4$, capacitor C and the base and emitter of the transistor $T_r$. However the brake lamp 17 is not lit because the second switch 12 is not turned on. If the second switch 12 is turned on, a circuit consisting of the power source 10, fuse 13, second switch 12 and first filament 171 be formed, so that power is supplied to the brake lamp 17 and the brake lamp 17 is lit and shines with ordinary brightness.

Emergency Application of the Brake

When the brake is applied to stop the vehicle in case of emergency, the brake pedal is stepped on rapidly with a violent force to depress the pedal at high speed. In such a case, the second switch 12 will be turned on with a time lag of several microseconds after the first switch 11 is turned on. The turning on of the first switch 11 will initiate the charging of the capacitor C of the time constant circuit 14 and a voltage will be supplied to the transistor $T_r$ through the second switch 12 before the completion of charging of the capacitor C. At this time, the capacitor C is not fully charged and the base current sufficiently large to fire the transistor $T_r$ flows to the transistor $T_r$ through the first switch 11. Therefore, the transistor $T_r$ will be fired and the relay solenoid 16 will be energized. This actuates the self-hold contact 18 of the relay and the contact 19 for supplying power to the second filament 172 for warning in the brake lamp 17. Thus, the two filaments 171 and 172 in the brake lamp 17 are lit, with a result that brightness of the brake lamp 17 is doubled. The relay solenoid 16 is held by the self-hold contact 18, so that it maintains the second filament 172 lit till the second switch 12 is turned off, even if the transistor $T_r$ is rendered inoperative as the flow of the base current to it is stopped after the capacitor C is fully charged.

Stated differently, the second filament 172 for warning will be lit if the time elapsing after the first switch 11 is turned on till the second switch 12 is turned on is shorter than the time interval in which the charge current passed to the capacitor C is reduced in value below the base current which is sufficiently large to turn on the transistor $T_r$. In this case, the second filament 172 for warning is lit after the first filament 171 in the brake lamp 17 is lit. However, since the time lag of the relay solenoid 16 is 10 to 20 microseconds, the two filaments look as if they were lit simultaneously.

In order to cope with variations in the voltage of the power source, the resistor $R_4$ and Zener diode ZD are used to keep constant the voltage applied between the capacitor C and earth so as to keep constant the time interval in which the value of the base current of the transistor $T_r$ is maintained above a predetermined level after the first switch 11 is closed even if the voltage of the power source fluctuates. This compensates for an error which might be caused by a variation in voltage and prevents an error in operation.

Figure 2:
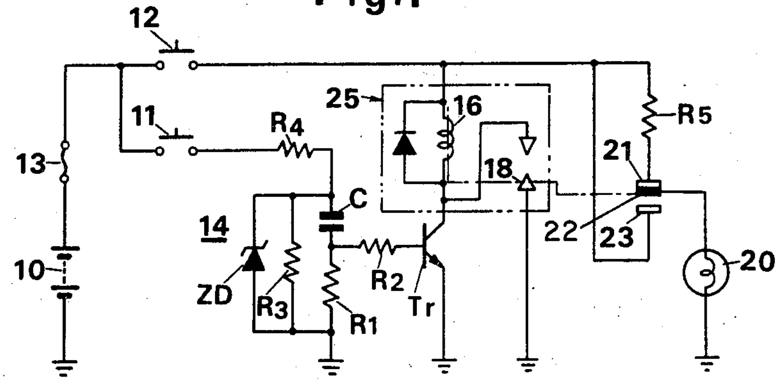
FIG. 2 is a circuit diagram of a second embodiment of this invention.

A second embodiment of the invention will now be explained. FIG. 2 shows this embodiment which uses one filament for indicating two levels, one level for normal application of the brake and the other level for emergency application of the brake.

A relay box 25 has a relay solenoid 16 and self-hold contact 18. In this example, the contact 19 of first embodiment is done without.

When normal application of the brake is to be indicated, a current is passed through the power source 10, fuse 13, second switch 12, resistor $R_5$, contact elements 21, 22, brake lamp 20 and earth, so that the voltage of the power source minus a voltage reduced by the resistor $R_5$ is applied to the lamp 20 to turn it on.

When emergency application of the brake is to be indicated, the second switch 12 is actuated with a time lag which is below the value set for the time constant circuit 14 as aforementioned after the first switch 11 is actuated, so that the relay solenoid 16 is energized and the contact elements 22 and 23 are closed. This results in a current passing through the power source 10, fuse 13, second switch 12, contact elements 23 and 22, brake lamp 20 and earth, so that the voltage of the power source is applied to the lamp 20. Thus, the lamp 29 shines more brightly when the brake is applied in case of emergency than otherwise.

Figure 3:
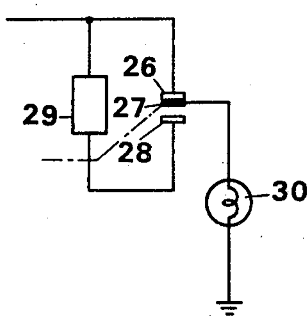
FIG. 3 is a fragmentary circuit diagram of a modification of the device according to this invention.

FIG. 3 shows a third embodiment of this invention in which the brake lamp is rapidly turned on and off at short intervals when the brake is applied in case of emergency.

In this embodiment, a flasher 29 is inserted in a circuit of contact elements 28 and 27 on the emergency brake side, with the resistor $R_5$ of the second embodiment being eliminated. Other principal parts are the same as in the second embodiment, so that they are not shown in the drawing. When normal application of the brake is to be indicated in this embodiment, a current passes through the power source 10, fuse 13, second switch 12, contact elements 26 and 27, brake lamp 30 and earth, so that the lamp 20 is turned on. When emergency application of the brake is to be indicated, a current passes through the power source 10, fuse 13, second switch 12, flasher 29, contact elements 28 and 27, brake lamp 30 and earth, so that the lamp 30 is rapidly turned on and off by the flasher 29.

The embodiments of the device shown and described rely on the detection of the speed at which the brake pedal is depressed in applying the brake. It is to be understood however that the device may be constructed such that the time elapsing after the depression of the brake pedal till the hydraulic pressure of the brake hydraulic system reaches a predetermined level is detected for deciding whether or not the brake is applied to cope with emergency as aforementioned.

The device of this invention is such that the driver of a following motor vehicle can learn immediately that the driver of a preceding automobile has applied the brake in case of emergency by noticing the warning lamp being turned on, so that the former can apply the brake by depressing the brake pedal with a violent force to bring his car to a halt. With this device, the time at which the brake is applied in case of emergency by the driver of a preceding car will be substantially the same as the time at which the brake is applied by the driver of a following car, thereby permitting to avoid the danger of collision between the two cars. Thus, the device of this invention ensures that the drivers can drive their cars safely.

From the foregoing description, it will be appreciated that the device of this invention provides means for positively warning the driver of a following automobile when the driver of a preceding car applies the brake in case of emergency by increasing the brightness of the so-called brake lamp or rapidly turning on and off the same. The device permits the driver of a following car readily to recognize the emergency warning lamp even in the daytime. At night, the emergency brake application warning lamp stimulates, when it is turned on, the driver of a following car and attracts his attention. Thus, the driver can drive his car without any fear of being bumped against from behind. The device of this invention is effective even when it rains or the fog is thick.

What is claimed is:

1. An abrupt brake application indicator for a motor vehicle having a brake system including a brake pedal, comprising: indicating means for indicating an abrupt application of the brakes; a first switch operatively connected to the brake system for detecting an initial movement of the brake pedal, said first switch being closed when the brake pedal is slightly depressed and while the brake pedal is depressed further; a second switch operatively connected to the brake system for detecting further movement of the brake pedal, said second switch being closed when the brake pedal is further depressed to a further position beyond a position in which said first switch is closed and while the brake pedal is further depressed beyond said further position; a decision circuit including a third switch and connected to said first switch, said decision circuit forming a signal for closing said third switch for a predetermined period of time after said first switch is closed; and a relay responsive to said second switch and said third switch and having contact means for operating said indicating means when the contact means is closed, said relay closing said contact means only when said second and third switches are concurrently closed, said indicating means being energized only when the movement of the brake pedal is fast enough to enable the second and third switches to be concurrently closed and only when said second and third switches are concurrently closed.

2. An abrupt brake application indicator for a motor vehicle having a brake system including a brake pedal as defined in claim 1, wherein said indicating means comprises : a stop lamp filament connected to said second switch; and a warning filament connected to said contact means, said indicating means including a lens adapted to be mounted on the tail of the motor vehicle, said warning filament being located with the stop filament in said lens.

3. An abrupt brake application indicator for a motor vehicle having a brake system including a brake pedal as defined in claim 1, wherein said contact means include two fixed contacts and one movable contact contactable with one or the other fixed contacts but normally contacting one fixed contact, said indicating means including a resistance between said second switch and the one fixed contact; a shorting wire connected between said second switch and the other fixed contact; and an indicating filament connected to the movable contact.

4. An abrupt brake application indicator for a motor vehicle having a brake system including a brake pedal as defined in claim 1, wherein said contact means includes two fixed contacts and one movable contact contactable with one or the other fixed contacts but normally contacting one fixed contact, said indicating means comprising : a conductive wire between said second switch and the one fixed contact of said relay; an intermittently conductive unit between said second switch and the other fixed contact of said relay, said intermittently conductive unit being intermittently conductive when energized; and an indicating filament connected to the movable contact.

5. An abrupt brake application indicator for a motor vehicle having a brake system including a brake pedal as defined in claim 1, wherein said first switch is mounted on the brake pedal, said first switch being closed when the brake pedal is initially depressed to a first point and while the brake pedal is further depressed; and said second switch is mounted on the brake pedal, said second switch being closed when the brake pedal is further depressed to a second point beyond the first point and while the brake pedal is depressed beyond the second point.

6. An abrupt brake application indicator for a motor vehicle having a brake system including a brake pedal as defined in claim 1, wherein said first switch is adapted to be mounted on the brake pedal so that said first switch is closed when the brake pedal is being pressed to one point and while the brake pedal is being depressed further; said second switch being adapted to be mounted in the hydraulic-pressure circuit so that said second switch is closed when the hydraulic-pressure in the brake system has reached a pressure beyond the pressure level corresponding to the one point and while the hydraulic-pressure exceeds the one pressure level.

7. An abrupt brake application indicator for a motor vehicle having a brake system including a brake pedal as defined in claim 1, wherein said decision circuit comprises: a resistance connected in series with said capacitance, circuit means forming a conductive path, said capacitance and resistance being connected in parallel with the conductive path, said capacitance being charged through said resistance when the first switch is closed during the time determined by the capacitance and resistance and discharged through the conductive path and resistance when said first switch is open; and said third switch being a transistor having a base connected between said capacitance and resistance and a collector-emitter path connected in series with said relay; said transistor being conductive when said second switch is closed while said capacitance is charging.

8. An automobile, comprising a braking system including a brake pedal, said brake pedal being capable of placing said braking system into early and more advanced braking conditions, first signal means responsive to a braking condition at and beyond an early braking condition, for producing a signal at and beyond the early braking condition, second signal means responsive to a braking condition at and beyond a more advanced braking condition for producing a signal at and beyond the more advanced braking condition, timer means connected to said first signal means and responsive to the start of the signal from said first signal means for producing a timing signal during a predetermined time period, coincidence gate means coupled to said second signal means and said timer means and responsive to the signal from said second signal means and the timing signal for producing a warning signal only in response to coincidence of the signal from said second signal means and the timing signal from said timer means, and warning means coupled to said coincidence gate from means fro producing a warning in response to a signal from said coincidence gate means, said warning means being mounted at the rear of the automobile.

9. An automobile as in claim 8, wherein said warning means includes a brake lamp.

10. An automobile as in claim 9, wherein said brake lamp includes a first filament responsive to the signal from said second signal means and a second filament responsive to the signal from said coincidence gate means.

11. An automobile as in claim 8, wherein said warning means includes a signal lamp mounted on the rear of the automobile and a lamp actuating means for turning on the lamp normally in response to the signal from said second signal means and for turning on the lamp brighter than normally in response to a signal from said coincidence gate means.

12. An automobile as in claim 8, wherein said warning means includes a lamp mounted at the rear of the vehicle, and actuating means for actuating the lamp in response to the signal from said second signal means, said warning means including interruptor means for flashing the lamp in response to signals from said coincidence gate means.

* * * * *